United States Patent [19]
Viot et al.

[11] Patent Number: 5,119,325
[45] Date of Patent: Jun. 2, 1992

[54] MULTIPLIER HAVING A REDUCED NUMBER OF PARTIAL PRODUCT CALCULATIONS

[75] Inventors: J. Greg Viot; James L. Broseghini; Eytan Hartung; John P. Dunn, all of Austin, Tex.

[73] Assignee: Motorola, Inc., Schaumburg, Ill.

[21] Appl. No.: 622,029

[22] Filed: Dec. 4, 1990

[51] Int. Cl.⁵ .............................................. G06F 7/52
[52] U.S. Cl. .................................................. 364/760
[58] Field of Search ............... 364/760, 759, 757, 758, 364/759

[56] References Cited

U.S. PATENT DOCUMENTS

| | | | |
|---|---|---|---|
| 4,745,570 | 5/1988 | Diedrich et al. | 364/760 |
| 4,807,175 | 2/1989 | Tokumaru et al. | 364/760 |
| 4,817,029 | 3/1989 | Finegold | 364/760 |
| 5,008,850 | 4/1991 | Jensen | 364/760 |

Primary Examiner—Long T. Nguyen
Attorney, Agent, or Firm—Robert L. King

[57] ABSTRACT

An adder circuit that has an encoded carry input, where a bit position weight of the carry input is two, allows the adder circuit to selectively concurrently add a data value of two to a first and a second input data operand of the adder circuit. The adder circuit is also able to add the first and second input data operands with a second carry input that is not encoded. A recoded multiplier combines two partial product calculations into one calculation during only a first partial product calculation operation by using the adder circuit. Partial product calculations are reduced in number during a multiply operation of a data processor.

16 Claims, 4 Drawing Sheets

| $A_{in}$ | $B_{in}$ | $C_{in1}$ | $C_{in2}$ | $S_{out}$ | $C_{out1}$ | $C_{out2}$ |
|---|---|---|---|---|---|---|
| 0 | 0 | 0 | 0 | 0 | 0 | 0 |
| 0 | 0 | 0 | 1 | 0 | 1 | 0 |
| 0 | 0 | 1 | 0 | 1 | 0 | 0 |
| 0 | 0 | 1 | 1 | NOT USED | | |
| 0 | 1 | 0 | 0 | 1 | 0 | 0 |
| 0 | 1 | 0 | 1 | 1 | 1 | 0 |
| 0 | 1 | 1 | 0 | 0 | 1 | 0 |
| 0 | 1 | 1 | 1 | NOT USED | | |
| 1 | 0 | 0 | 0 | 1 | 0 | 0 |
| 1 | 0 | 0 | 1 | 1 | 1 | 0 |
| 1 | 0 | 1 | 0 | 0 | 1 | 0 |
| 1 | 0 | 1 | 1 | NOT USED | | |
| 1 | 1 | 0 | 0 | 0 | 0 | 1 |
| 1 | 1 | 0 | 1 | 0 | 1 | 0 |
| 1 | 1 | 1 | 0 | 1 | 1 | 0 |
| 1 | 1 | 1 | 1 | NOT USED | | |

DATA PROCESSOR
CYCLES

| | |
|---|---|
| 1 | PARTIAL PRODUCT 1<br>PARTIAL PRODUCT 2 |
| 2 | PARTIAL PRODUCT 3<br>PARTIAL PRODUCT 4 |
| 3 | PARTIAL PRODUCT 5<br>PARTIAL PRODUCT 6 |
| 4 | PARTIAL PRODUCT 7<br>PARTIAL PRODUCT 8 |
| 5 | INSTRUCTION FETCH |

*FIG.4A*
-PRIOR ART-

DATA PROCESSOR
CYCLES

| | |
|---|---|
| 1 | PARTIAL PRODUCT 2<br>PARTIAL PRODUCT 3 |
| 2 | PARTIAL PRODUCT 4<br>PARTIAL PRODUCT 5 |
| 3 | PARTIAL PRODUCT 6<br>PARTIAL PRODUCT 7 |
| 4 | PARTIAL PRODUCT 8<br>INSTRUCTION FETCH |

*FIG.4B*

MULTIPLIER HAVING A REDUCED NUMBER OF PARTIAL PRODUCT CALCULATIONS

CROSS REFERENCE TO RELATED APPLICATION

This application is related to our commonly assigned copending patent application entitled, "AN ADDER CIRCUIT WITH AN ENCODED CARRY" by Viot et al., Ser. No. 07/622,078, now U.S. Pat. No. 5,051,943, filed simultaneously herewith.

FIELD OF THE INVENTION

This invention relates generally to multiplier circuits for data processors, and more particularly to a multiplier circuit using a recoding algorithm.

BACKGROUND OF THE INVENTION

A multiplier within a data processor may be implemented using a variety of methods. One known method is to use a dedicated hardware multiplier circuit. A dedicated hardware multiplier circuit typically has an array of full adder cells connected such that both the multiplicand and multiplier operands are multiplied by one another by utilizing a series of shift and addition operations. A problem with a dedicated hardware multiplier is the large physical area required to implement the multiplier. However, the advantage of a dedicated hardware multiplier is the relatively short amount of time required to process a multiply operation.

Another known method of implementing a multiply operation within a data processor is by utilizing a multiply recoding algorithm. The purpose of a recoding algorithm is to reduce the number of addition operations, which determine the partial products, required to complete a processor multiply instruction. A conventional add-shift multiply operation that has an M-bit multiplicand operand and an N-bit multiplier operand, where M and N are integers, typically requires an N-number of addition operations to complete a processor multiply instruction. By utilizing a recoding algorithm such as Booth's recoding algorithm or Modified Booth's recoding algorithm, the number of addition operations required to complete the multiply instruction can be significantly reduced. A multiplier that utilizes Booth's recoding algorithm is taught by Tokumaru et al. in U.S. Pat. No. 4,807,175, entitled "Booth's Multiplier." Tokumaru et al. utilize two separate adder units to calculate two separate intermediate partial products, then sum the two separate intermediate partial products with a previously formed full partial product in two additional adder units to calculate each new full partial product. The Tokumaru et al. multiplier increases the multiply operation performance at the expense of requiring additional adder units and fully duplicative recoding logic for each partial product calculation. A substantial increase in die area results in order to be able to calculate each and every possible partial product term. The Tokumaru et al. multiplier requires a significant amount of additional hardware to calculate each partial product simultaneously, before summing the calculated partial products with an arithmetic logic unit. As a result, the processing speed of the multiply operation can be improved by a factor for two. A disadvantage with known recoding multipliers which concurrently perform two partial product calculations is the required increase in transistor circuits and resulting die area to perform the additional partial product calculations.

SUMMARY OF THE INVENTION

The previously mentioned needs are fulfilled with the present invention. A multiplier having a reduced number of partial product calculations comprises a first storage means having an input and an output. The first storage means receives and stores a multiplier operand. A second storage means has an input and an output, the second storage means receives and stores a multiplicand operand. A recoding means is coupled to the output of the first storage means for recoding a first predetermined number of bits of the multiplier operand in accordance with a predetermined recoding algorithm to provide a first control signal. The recoding means also recodes a second predetermined number of bits of the multiplier operand in accordance with the predetermined recoding algorithm to provide a second control signal. The recoding means also detects whether the recoding of either or both the first or second predetermined number of bits has generated a negative recoding factor and provides a third control signal in response to said detecting. An arithmetic logic unit (ALU) is coupled to the recoding means and to the first and second storage means. Said arithmetic logic unit simultaneously implements a recoding of two initial portions of the multiplier operand by separately performing a predetermined operation on the multiplicand operand in response to each of the first and second control signals to form two data values and adds the two data values selectively with a recode value in response to the third control signal to provide a partial product output. Said arithmetic logic unit sucessively forms any other partial products required by recoding only one portion of the multiplier operand per partial product until a final output product is generated.

BRIEF DESCRIPTION OF THE DRAWINGS

FIG. 1 (B) illustrates in tabular form an adder truth table in accordance with the present invention.

FIG. 4 (A) illustrates in tabular form the number of partial product calculations needed for a multiply instruction.

FIG. 4 (B) illustrates in tabular form the number of partial product calculations for a multiply instruction in accordance with the present invention.

DESCRIPTION OF A PREFERRED EMBODIMENT

Figures 1A, 1B:
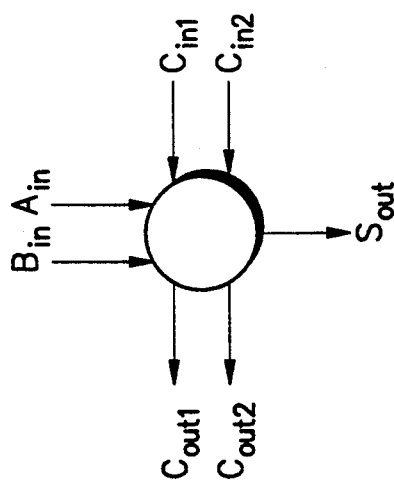
FIG. 1 (A) illustrates in symbolic form an adder symbol in accordance with the present invention.

FIG. 1 (A) and FIG. 1 (B) respectively illustrate an adder symbol and a truth table of an adder circuit in accordance with the present invention. The adder symbol of FIG. 1 (A) has an A-input ($A_{in}$), a B-input ($B_{in}$), a first Carry-input ($C_{in1}$), a second Carry-input ($C_{in2}$), a first Carry-output ($C_{out1}$), a second Carry-output ($C_{out2}$), and a Sum-out ($S_{out}$). The adder truth table illustrated in FIG. 1 (B) illustrates the data output of the adder symbol of FIG. 1 (A) as a function of its four inputs. Although the adder symbol for the present invention illustrated in FIG. 1 (A) may appear similar to that of an adder symbol of a standard four input adder circuit, the truth table for the adder of the present invention is significantly different than that of a conventional four input adder circuit due to a bit weight encoding of the $C_{in2}$ input.

As shown in FIG. 1 (B), the truth table represents the operation of the adder circuit of the present invention. The function of the adder symbol of FIG. 1 (A) is determined by the logic values at carry-input $C_{in1}$ and carry-input $C_{in2}$; if $C_{in1} = C_{in2} = 0$, the function of the adder is $(A_{in} + B_{in})$. If carry-input $C_{in1} = 1$ and carry-input $C_{in2} = 0$, the function of the adder is $(A_{in} + B_{in} + 1)$. If carry-input $C_{in1} = 0$ and carry-input $C_{in2} = 1$, the function of the adder is $(A_{in} + B_{in} + 2)$, and if carry-input $C_{in1} = C_{in2} = 1$, the function of the adder in the illustrated form is not utilized. The function $(A_{in} + B_{in} + 2)$ is a necessary function for an adder circuit used within our recoded multiplier discussed below.

Figure 2:
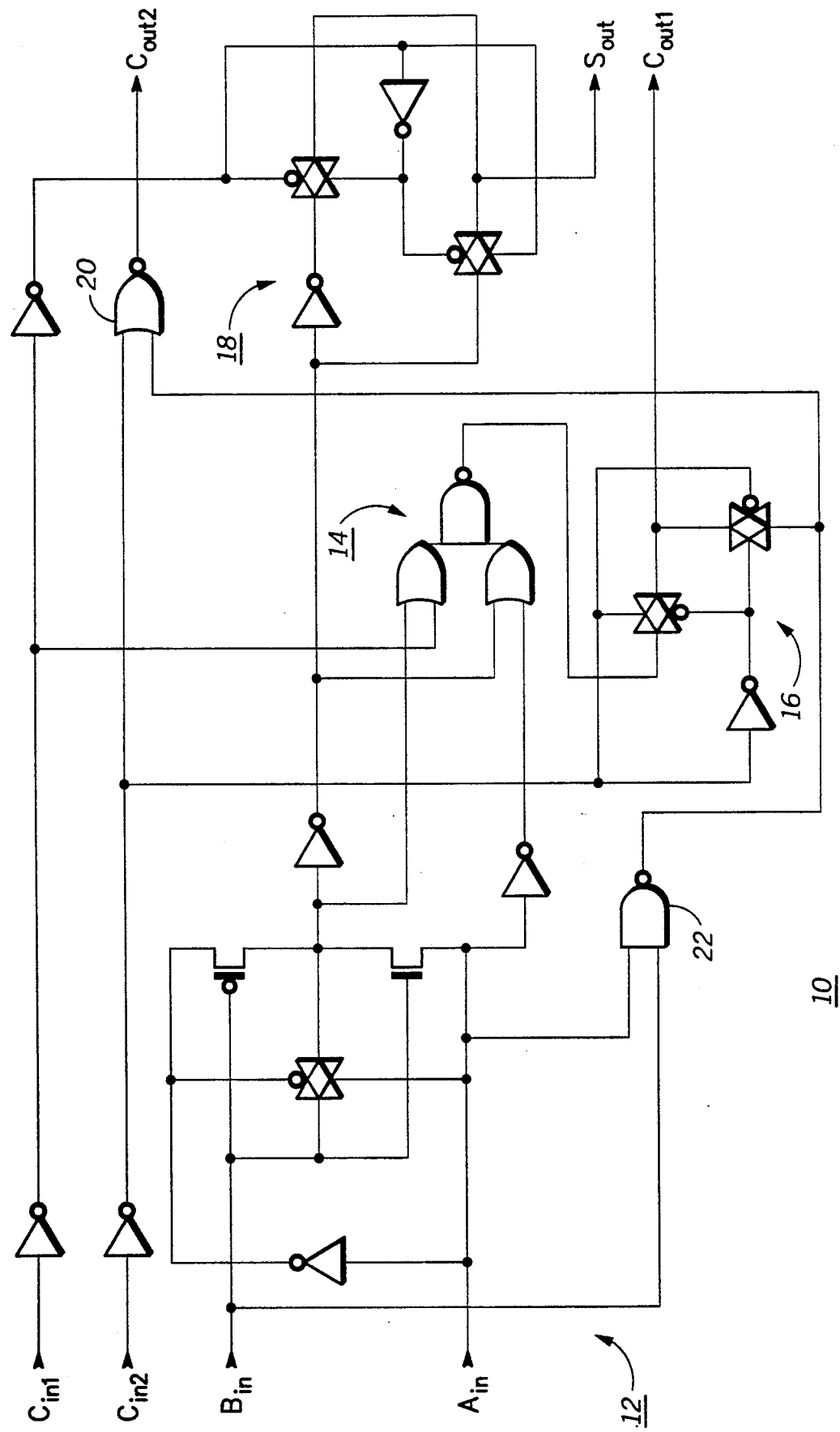
FIG. 2 illustrates in circuit diagram form an implementation of an adder in accordance with the present invention.

Illustrated in FIG. 2 is an adder 10 which is a circuit implementation of the adder symbol and truth table of FIG. 1 (A) and FIG. 1 (B), in accordance with the present invention. Adder 10 of FIG. 2 has an exclusive-OR (XOR) portion 12, a carry-output $C_{out1}$ logic portion 14, a carry-output $C_{out1}$ multiplexor (mux) portion 16, a sum-output $S_{out}$ portion 18, and logic to generate a carry-output $C_{out2}$ signal. The carry-output $C_{out2}$ logic has a NOR gate 20 and a NAND gate 22. In general, exclusive-OR portion 12 may be considered as a first logic portion, portions 14, 16 and 18 may be considered as a second logic portion, and NAND gate 22 and NOR gate 20 may be considered as a third logic portion. The exclusive OR portion 12 has a first input for receiving a data signal or bit labeled "$A_{in}$", and a second input for receiving a data signal or bit labeled "$B_{in}$". The output of the exclusive OR portion 12 is connected to both an input of the carry-output $C_{out1}$ logic portion 14 and to an input of the sum-output $S_{out}$ portion 18 through an inverter. Another input to the carry-output $C_{out1}$ logic portion 14 is the signal carry-input $C_{in1}$, which is then logically inverted. The output of the carry-output $C_{out1}$ logic portion 14 is connected to a first input of the carry-output $C_{out1}$ mux portion 16. The carry-output $C_{out1}$ mux portion 16 has a second input for receiving an output of the NAND gate 22. The carry-output $C_{out1}$ mux portion 16 is controlled by the logic state of the carry-input $C_{in2}$ signal. The NAND gate 22 has a first and a second input for receiving the data signals $A_{in}$ and $B_{in}$, respectively. The NOR gate 20 has a first input for receiving an output of the NAND gate 22, and a second input from the carry-input $C_{in2}$ signal in logically inverted form. An output of the NOR gate 20 provides carry-output $C_{out2}$.

In operation, the exclusive OR portion 12 provides an exclusive-OR output of the input signals $A_{in}$ and $B_{in}$ for partially determining the value of the sum-output $S_{out}$ and the carry-output $C_{out1}$ signals. If the carry-input $C_{in2}$ signal is a logic zero, the carry-output $C_{out2}$ signal is a logic zero, and the logic values of the carry-output $C_{out1}$ and the sum-output $S_{out}$ signals are determined solely by the inputs $A_{in}$, $B_{in}$, and $C_{in1}$. Also, when the carry-input $C_{in2}$ signal is a logic zero, the sum-output $S_{out}$ and carry-output $C_{out1}$ signal outputs of adder 10 are the same as for a standard two-input adder circuit with a single carry-input. Further, when the carry-input $C_{in2}$ signal is a logic zero, the carry-output $C_{out1}$ mux portion 16 connects the output of the carry-output $C_{out1}$ logic portion 14 to the carry-output $C_{out1}$ output of adder 10. As can be seen from FIG. 2, the sum-output $S_{out}$ signal is independent of the logic state of the carry-input $C_{in2}$ signal. The carry-input $C_{in2}$ signal affects only the logic state of the carry-output $C_{out2}$ and the carry-output $C_{out1}$ signals. When the carry-input $C_{in2}$ signal is a logic one, the carry-output $C_{out1}$ mux portion 16 connects the output of the NAND gate 22 to the carry-output $C_{out1}$ signal output of adder 10. Therefore, when the carry-input $C_{in2}$ signal is a logic one, the carry-output $C_{out1}$ signal output of adder circuit 10 is the logical NAND of the data input signals $A_{in}$ and $B_{in}$. The output of the NAND gate 22 also determines, in part, the carry-output $C_{out2}$ signal output of adder 10. As can be seen in the truth table of FIG. 1 (B), and the circuit diagram of FIG. 2, only when the data input signals $A_{in}$, $B_{in}$ and carry-input $C_{in2}$ are each a logic one, will the carry-output $C_{out2}$ signal of adder 10 be a logic one. When the data input signals $A_{in}$ and $B_{in}$ of adder 10 are each a logic one, the output of the NAND gate 22, which is also the first input to the NOR gate 20, is a logic zero. When the carry-input $C_{in2}$ signal is a logic one, the second input to the NOR gate 20 is a logic zero. Therefore, when the carry-input $C_{in2}$ signal is a logic one and the data input signals $A_{in}$ and $B_{in}$ are each a logic one, the output of the NOR gate 20, carry-output $C_{out2}$, is a logic one. In this particular logic implementation of adder 10 of FIG. 2, if carry-input signals $C_{in1}$ and $C_{in2}$ are each a logic one, the logic function of adder 10 is identical to the condition of when carry-input signal $C_{in1}$ is a logic zero and carry-input $C_{in2}$ is a logic one. Essentially, the condition of the carry-input signal $C_{in2}$ being a logic one causes the carry-input signal $C_{in1}$ to become a 'don't-care' input condition.

Figure 3:
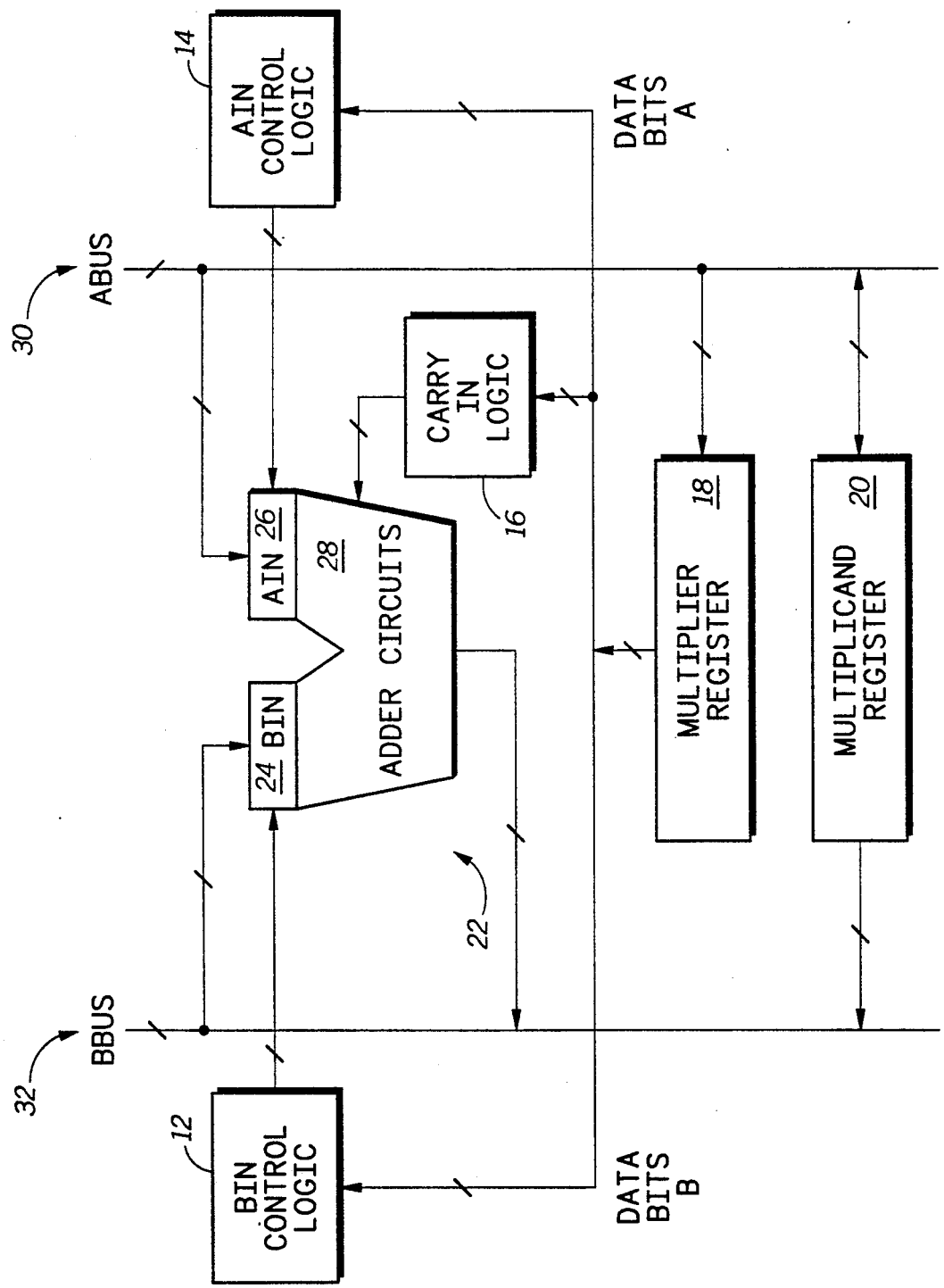
FIG. 3 illustrates in block diagram form a multiplier in accordance with the present invention.

FIG. 3 illustrates a multiplier implemented in hardware within a data processor. The multiplier of FIG. 3 has a $B_{in}$ 12 control logic, an $A_{in}$ 14 control logic, a carry-in logic 16, a multiplier register 18, a multiplicand register 20 and an arithmetic logic unit (ALU) portion 22. Both multiplier register 18, and multiplicand register 20 are data storage registers. The ALU portion 22 has a $B_{in}$ 24 multiplexor, an $A_{in}$ 26 multiplexor, and adder circuits 28. The adder circuits 28 contain a plurality of adder cells, each of which is illustrated in FIG. 1 (A), FIG. 1 (B) and FIG. 2.

The $B_{in}$ control logic 12 has a data input connected to an output of the multiplier register 18 to receive data, a control output connected to a first input of the $B_{in}$ 24 multiplexor, and is itself controlled by control logic (not shown). The $A_{in}$ 14 control logic has a data input connected to an output of the multiplier register 18 to receive data, a control output connected to a first input of the $A_{in}$ 26 multiplexor, and is itself controlled by a control logic (not shown). The carry-in logic 16 has a data input connected to an output of the multiplier register 18 to receive data, a control output connected to an input of each of the adder circuits 28, and is itself controlled by a control logic (not shown). In one form of the invention, adder circuits 28 are implemented by a plurality of adder circuits such as adder 10 in FIG. 2. The sum outputs of all adders are connected in parallel and the carry outputs of each adder are respectively connected in series. When using a plurality of adder 10 circuits as adder circuits 28, the control output of the carry-in logic 16 is a two signal control output. One of the two signals is connected to the carry-input $C_{in1}$ of a least significant adder circuit. A second of the two signals of carry-in logic 16 is connected to the carry-input $C_{in2}$ of the least significant adder circuit.

The multiplier register 18 has a data input connected to a data bus, $A_{bus}$ 30, in order to receive data, and is controlled by a control logic (not shown). The multiplicand register 20 has a data input connected to the $A_{bus}$ 30 in order to receive data, a data output connected to the $A_{bus}$ 30, a data output connected to a data bus, $B_{bus}$ 32, and is controlled by control logic (not shown). The $B_{in}$ 24 multiplexor has a second input connected to the $B_{bus}$ 32 in order to receive data, and an output (not shown) connected to a predetermined one of the $B_{in}$ terminals of an adder cell, illustrated in FIG. 1 (A), within the plurality of adder circuits 28. The $A_{in}$ 26 multiplexor has a second input connected to the $A_{bus}$ 30 to receive data, and an output (not shown) connected to a predetermined one of the $A_{in}$ terminals of an adder cell, illustrated in FIG. 1 (A), within the plurality of the adder circuits 28. Each of the adder circuits 28 has a data output ($S_{out}$) connected to the $B_{bus}$ 32, and is controlled by control logic (not shown).

In operation, the multiplier register 18 is loaded with a multiplier operand via the $A_{bus}$ 30 from a data register (not shown), and the multiplicand register 20 is loaded with a multiplicand operand via the $A_{bus}$ 30 from a data register (not shown). A predetermined number of least significant data bits, data bits B, from the multiplier register 18 are recoded by the $B_{in}$ 12 control logic. The output of the $B_{in}$ 12 control logic is then used to control the $B_{in}$ 24 multiplexor as described below. Table 1 illustrates the recoding performed by the $B_{in}$ 12 control logic in accordance with Booth's algorithm. It should be apparent that the present invention may be practiced by using other recoding algorithms.

TABLE 1

| DATA BITS B | $B_{in}$ MULTIPLICAND MULTIPLE |
|---|---|
| 0 0 | 0 |
| 0 1 | 1 |
| 1 0 | −2 |
| 1 1 | −1 |

When the "$B_{in}$ multiplicand multiple" is a "one", or a "negative one", the $B_{in}$ 12 control logic provides control to the $B_{in}$ 24 multiplexor to shift the input data by zero. When the "$B_{in}$ multiplicand multiple" is a "negative two", the $B_{in}$ 12 control logic provides control to the $B_{in}$ 24 multiplexor to shift the input data left by one bit position. When the "$B_{in}$ multiplicand multiple" is a "zero", the $B_{in}$ 12 control logic provides control to the $B_{in}$ 24 multiplexor to zero the input data operand. During the same time period as the first recoding, a predetermined number of data bits from the multiplier register 18, data bits A, are recoded by the $A_{in}$ 14 control logic. The control output of the $A_{in}$ 14 control logic is used to control the $A_{in}$ 26 multiplexor. Table 2 below illustrates the recoding performed by the $A_{in}$ 14 control logic in accordance with Booth's algorithm.

TABLE 2

| DATA BITS A | $A_{in}$ MULTIPLICAND MULTIPLE |
|---|---|
| 0 0 0 | 0 |
| 0 0 1 | 4 |
| 0 1 0 | 4 |
| 0 1 1 | 8 |
| 1 0 0 | −8 |
| 1 0 1 | −4 |
| 1 1 0 | −4 |
| 1 1 1 | 0 |

When the "$A_{in}$ multiplicand multiple" is a "zero", the $A_{in}$ 14 control logic provides control to the $A_{in}$ 26 multiplexor to zero the input data operand. When the "$A_{in}$ multiplicand multiple" is a "four" or "negative four", the $A_{in}$ 14 control logic provides control to the $A_{in}$ 26 multiplexor to shift the input data left by two bit positions. When the "$A_{in}$ multiplicand multiple" is an "eight" or a "negative eight", the $A_{in}$ 14 control logic provides control to the $A_{in}$ 26 multiplexor to shift the input data left by three bit positions. During the same time period as the previous recodings, the carry in logic 16 determines the value of the carry-in for the adder circuits 28 based on the sign of both the "$A_{in}$ multiplicand multiple" and the "$B_{in}$ multiplicand multiple". If the signs of both the "$A_{in}$ multiplicand multiple" and the "$B_{in}$ multiplicand multiple" are each negative, the carry-in for the adder circuits 28 is a "two". If the sign of either "$A_{in}$ multiplicand multiple" or the "$B_{in}$ multiplicand multiple" is negative, but not both negative, the carry-in for the adder circuits 28 is a "one". If the sign of both the "$A_{in}$ multiplicand multiple" and the "$B_{in}$ multiplicand multiple" are positive, the carry-in for the adder circuits 28 is a "zero". The multiplicand operand data within the multiplicand register 20 is then connected to both the $B_{in}$ 24 multiplexor and the $A_{in}$ 26 multiplexor via the $B_{bus}$ 32 and the $A_{bus}$ 30, respectively. The $A_{in}$ 26 and $B_{in}$ 24 multiplexors shift the multiplicand operand in accordance with the control provided by the $A_{in}$ 14 control logic and the $B_{in}$ 12 control logic, respectively. The adder circuits 28 then sum the shifted data provided by the $A_{in}$ 26 and the $B_{in}$ 24 multiplexors along with the carry-in provided by the carry in logic 16 to produce a first partial product output which is stored in a latch (not shown) within the adder circuits 28. For any remaining partial product calculations, the $B_{in}$ 12 control logic is not utilized. The calculation of any subsequent partial product terms is performed by using only the $A_{in}$ control logic 14 and carry in logic 16 to recode in accordance with the predetermined recoding algorithm. The multiplier operand within the multiplier register 18 provides a predetermined portion of data bits to both the $A_{in}$ 14 control logic and the carry in logic 16, for recoding purposes, for each of the remaining partial product calculations. The multiplication operation is complete, and the result is latched into the storage register (not shown) within the adder circuits 28, when all of the remaining predetermined portions of data bits for recoding within the multiplier operand have been utilized.

By performing the minimal additional recoding of the multiplier operand with the $B_{in}$ 12 control logic during the first partial product calculation, the total number of partial product calculations for the multiply instruction has been reduced. FIG. 4 (A) illustrates the number of data processor cycles required to perform a typical sixteen bit-by-sixteen bit multiply instruction with a conventional multiplier (not shown). FIG. 4 (A) illustrates that four data processor cycles are required to calculate the eight partial product terms necessary for the multiply instruction, and that a fifth data processor cycle is utilized to fetch the next instruction. In contrast, FIG. 4 (B) illustrates that both the number of data processor cycles and the total number of partial product calculations necessary to perform the same multiply operation have been reduced by one. This allows an instruction fetch for an immediately following instruction to occur during the final machine cycle in which the final partial product for the multiply instruction is being calculated. FIG. 4 (B) illustrates that during the first data processor cycle, partial product two and partial product three are calculated. It should be noted that a complete partial product one equivalent to the first partial product in FIG. 4 (A) is never calculated within the multiplier of FIG. 3. In contrast, FIG. 4 (B) illustrates that during an equivalent time period, the first data processor cycle, the first and second partial products are being calculated for the same multiply instruction illustrated in FIG. 4 (A).

In summary, the adder 10 of FIG. 2 does not perform a standard four-input adder function, but rather provides a three-input adder function plus an additional arithmetic function by using a weighted fourth input. The weight of the fourth input, in this particular implementation, is a value of two. When the fourth input signal, $C_{in2}$, is a logical one, adder 10 of FIG. 2 performs the logical function of $(A_{in} + B_{in} + 2)$. When the $C_{in2}$ input signal is a logical zero, the output of adder 10 is logically identical to a conventional two-input adder with a carry-in. In the implementation of circuit 10 in FIG. 2, the input signal condition of both carry-input $C_{in1}$ and $C_{in2}$ equaling a logic one is not used, and when the carry-input signal $C_{in2}$ is a logical one, the carry-input $C_{in2}$ signal overrides the carry-input $C_{in1}$ signal. By adding a small amount of additional recoding logic in the form of the Bin 24 control logic of FIG. 3 and by using an adder which can selectively perform the function of $(A_{in} + B_{in} + 2)$, the total number of data processor cycles for a multiply instruction is reduced by twenty percent, as illustrated in both FIG. 4 (A) and FIG. 4 (B).

By now it should be apparent that there has been provided an adder circuit with an encoded carry input, where the encoded carry input has a bit position weight different than those of the other inputs to the adder circuit. It should be well understood that although the above described invention utilizes a weighted carry input of two, alternate values of weight along with combinations of weighted input values may be used. Although the number of bits utilized for the $B_{in}$ 12 control logic recoding is two, as illustrated in Table one, and the number of bits utilized for the $A_{in}$ 14 control logic recoding is three, as illustrated in Table two, any number of recoding bits may be used. It should also be apparent that the adder circuits of the multiplier of FIG. 3 may also be included within an array of adders in an array multiplier.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:
1. In a data processor having a multiplier which generates a product of a multiplier operand and a multiplicand operand by forming a plurality of partial products within a plurality of successive data processing timing cycles, the multiplier comprising:

first storage means having an input and an output, the first storage means receiving and storing the multiplier operand;

second storage means having an input and an output, the second storage means receiving and storing the multiplicand operand;

recoding means coupled to the output of the first storage means for recoding only during a first of the data processing cycles a plurality of least significant bits of the multiplier operand in accordance with a predetermined recoding algorithm to provide a first control signal, said recoding means concurrently recoding a second plurality of bits of the multiplier operand in accordance with the predetermined recoding algorithm to provide a second control signal, said recoding means further detecting if a negative recoding factor is generated and providing a third control signal in response thereto, said recoding means successively recoding each group of a remaining plurality of groups of plural bits of the multiplier operand in accordance with the predetermined recoding algorithm by only generating the second and third control signals; and an arithmetic logic unit (ALU) coupled to the recoding means and to the first and second storage means, said arithmetic logic unit performing a shifting operation on the multiplicand operand in response to each of the first and second control signals to form two data values and adding the two data values selectively with a recode value determined by the third control signal to provide a partial product output, said arithmetic logic unit successively forming other partial products required in response to recoding only one portion of the multiplier operand per partial product until a final output product is generated.

2. The multiplier of claim 1 wherein said recode value is one when the third control signal indicates that only one of the first or second recodings has generated a negative recoding factor, and said recode value is two when the third control signal indicates that both of the first and second recodings have generated a negative recoding factor.

3. The multiplier of claim 1 wherein said ALU further comprises:

a first multiplexor having a data input coupled to the output of the first storage means, an output, and a control input coupled to the first control signal, said first multiplexor selectively implements one of shifting and inverting the multiplicand operand, shifting the multiplicand operand, or inverting the multiplicand operand, in response to the first control signal;

a second multiplexor having a data input coupled to the output of the first storage means, an output and a control input coupled to the second control signal, said second multiplexor selectively implements one of shifting and inverting the multiplicand operand, shifting the multiplicand operand, or inverting the multiplicand operand, in response to the second control signal; and a plurality of adder circuits coupled to the first and second multiplexors, each of the adder circuits having first, second, third and fourth inputs respectively coupled to the output of the first multiplexor, to the output of the second multiplexor, to the third control signal and to the third control signal, and each of the adder circuits having and output for providing a portion of final output product.

4. The multiplier of claim 3 wherein the second storage means has a first output coupled to the data input of the first multiplexor and has a second output coupled to the data input of the second multiplexor.

5. The multiplier of claim 3 wherein the first multiplexor shifts the multiplicand operand by either zero or one bit position, and the second multiplexor selectively shifts the multiplicand operand by either two or three bit positions.

6. The multiplier of claim 1 wherein the plurality of least significant bits is two and the second plurality of bits is three.

7. The multiplier of claim 1 wherein the detecting whether either the first or second recodings has generated a negative recoding factor further comprises logic circuitry within the recoding means for receiving the first plurality of least significant bits of the multiplier operand and the second predetermined number of bits of the multiplier operand and encoding in accordance with the predetermined recoding algorithm.

8. In a recoded multiplier, a method of reducing a number of required partial product calculations, comprising the steps of:
receiving via a data bus a multiplier operand and storing the multiplier operand in a register means;
receiving via the data bus a multiplicand operand and storing the multiplicand operand in the register means;
providing a recoder circuit;
coupling the multiplier operand to the recoder circuit;
recoding a first predetermined number of least significant bits of the multiplier operand in accordance with a predetermined recoding algorithm to provide a first control signal;
concurrently recoding a second predetermined number of bits of the multiplier operand in accordance with the predetermined recoding algorithm to provide a second control signal;
coupling detecting circuitry which is within the recoder circuit to the register means for detecting whether either one or both of the recodings of the first and second predetermined number of bits of the multiplier operand generated a negative recoding factor in accordance with the predetermined recoding algorithm;
providing a third control signal in response to said detecting;
providing shifting circuitry;
coupling each of the first and second control signals and the multiplicand operand to the shifting circuitry to independently shift the multiplicand operand in response to each of the first and second control signals to respectively form first and second shifted operands;
coupling a plurality of adder circuits to the shifting circuitry;
coupling the first and second shifted operands to the plurality of adder circuits, the adder circuits adding the first and second shifted operands selectively with a recode value in response to the third control signal to provide a partial product output; and
successively forming with the shifting circuitry and the plurality of adder circuits all other partial products required by recoding only one portion of the multiplier operand per partial product until a final partial product is generated as an output product in accordance with the predetermined recoding algorithm, the first control signal not being asserted while said all other partial products are formed.

9. The method of claim 8 wherein the step of recoding a first predetermined number of least significant bits comprises recoding two least significant bits of the multiplier operand and the step of concurrently recoding a second predetermined number of bits comprises recoding three bits of the multiplier operand.

10. The method of claim 8 wherein the steps of recoding in accordance with a predetermined recoding algorithm comprises recoding in accordance with Booth's algorithm.

11. The method of claim 8 wherein the step of adding the first and second shifted operands with a recode value further comprises adding either zero, one, or two as the recode value to the first and second shifted operands.

12. A recoded multiplier circuit which multiplies a multiplier operand and a multiplicand operand, comprising:
first recoding means coupled to the multiplier operand for recoding only two least significant bits of the multiplier operand in accordance with a predetermined recoding algorithm, the first recoding means providing a first control signal in response thereto;
second recoding means coupled to the multiplier operand for successively recoding groups of three bits of the multiplier operand in accordance with the predetermined recoding algorithm, the second recoding means successively providing a second control signal in response to recoding each group of three bits;
third recoding means coupled to the first and second recoding means for detecting whether the first or second recoding means or both has generated a negative recoding factor and providing a third control signal in response thereto; and
processing means coupled to the first, second and third recoding means for respectively receiving the first, second and third control signals, said processing means forming and adding a succession of partial product terms, a first partial product term representing a summation of two recoding operations implemented separately and respectively in response to the first and second control signals, each control signal causing a shift of the multiplicand operand to form a predetermined one of two shifted data values, the processing means summing the two shifted data values with a value of two when two negative recoding factors are detected by the third recoding means, said processing means only using the second and third recoding means after the first partial product term is generated to generate the succession of partial product terms and output a final partial product term as a final output product.

13. The recoded multiplier of claim 12 further comprising:
first storage means having an input for receiving and storing the multiplier operand, and having an output coupled to the first, second and third recoding means; and
second storage means having an input for receiving and storing the multiplicand operand, and having an output coupled to the processing means for providing the multiplicand operand to the processing means.

14. The recoded multiplier of claim 13 wherein the processing means further comprise an arithmetic logic unit having a plurality of adder circuits, each adder circuit having an ability to selectively sum two input bits of the two data values with a value of two.

15. The recoded multiplier of claim 12 wherein the predetermined recoding algorithm is Booth's algorithm.

16. The recoded multiplier of claim 15 wherein the first recoding means further comprise first logic circuitry capable of only implementing a portion of Booth's algorithm, the second recoding means further comprise second logic circuitry capable of fully implementing Booth's algorithm, and the third recoding means further comprise third logic circuitry for detecting when either one or both of the first and second logic means generate a negative recoding factor by providing an input signal to the processing means indicating to add by either one or two, respectively.

* * * * *